United States Patent
Jalal et al.

(10) Patent No.: US 12,517,702 B2
(45) Date of Patent: Jan. 6, 2026

(54) CONTINUOUS INTEGRATION AND DEVELOPMENT OF CODE IN A SECURE ENVIRONMENT

(71) Applicant: GENENTECH, INC., South San Francisco, CA (US)

(72) Inventors: Niaz Ahsan Jalal, South San Francisco, CA (US); Abdesslem Dridi, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 164 days.

(21) Appl. No.: 18/305,908

(22) Filed: Apr. 24, 2023

(65) Prior Publication Data

US 2023/0305813 A1 Sep. 28, 2023

Related U.S. Application Data

(63) Continuation of application No. PCT/US2021/058409, filed on Nov. 8, 2021.
(Continued)

(51) Int. Cl.
*G06F 8/10* (2018.01)
*G06F 8/61* (2018.01)
(Continued)

(52) U.S. Cl.
CPC ............... *G06F 8/10* (2013.01); *G06F 8/63* (2013.01); *G06F 8/71* (2013.01); *G06F 11/3604* (2013.01)

(58) Field of Classification Search
CPC ..... G06F 8/10; G06F 8/71; G06F 8/63; G06F 8/3604
See application file for complete search history.

(56) References Cited

U.S. PATENT DOCUMENTS 10,782,934 B1 * 9/2020 Chawda ................. G06F 8/71
11,947,946 B1 * 4/2024 Rao ........................ G06F 8/71
(Continued)

OTHER PUBLICATIONS

"DoD Enterprise DevSecOps Reference Design", Department of Defense (DoD) Chief Information Officer, Available online at:https://dodcio.defense.gov/Portals/0/Documents/DoD%20Enterprise%20DevSecOps%20Reference%20Design%20v1.0_Public%20Release.pdf, Aug. 12, 2019, 89 pages.
(Continued)

*Primary Examiner* — Wei Y Mui
*Assistant Examiner* — Brahim Bourzik
(74) *Attorney, Agent, or Firm* — Kilpatrick Townsend & Stockton LLP

(57) ABSTRACT

The present disclosure relates to techniques for continuous integration and continuous deployment of source code on a digital health platform. Particularly, aspects are directed to receiving source code from a software development system (the source code being validated in accordance with a first QMS), generating a profile for the source code, classifying the source code into a class of code based on the profile, retrieving a second QMS associated with the class of code, validating the source code in accordance with the second QMS, upon validation of the source code, executing a build process to generate a executable program from the source code, encapsulating the executable program in a container, and deploying the container on one or more nodes of a software platform. The first QMS is adapted from the perspective of the software development system; whereas the second QMS is adapted from the perspective of the software platform.

20 Claims, 6 Drawing Sheets

Related U.S. Application Data

(60) Provisional application No. 63/111,991, filed on Nov. 10, 2020.

(51) Int. Cl.
  *G06F 8/71* (2018.01)
  *G06F 11/3604* (2025.01)

(56) References Cited

U.S. PATENT DOCUMENTS

| | | | | |
|---|---|---|---|---|
| 2016/0283360 | A1* | 9/2016 | Allen | G06F 11/3688 |
| 2018/0121659 | A1* | 5/2018 | Sawhney | G06F 21/566 |
| 2021/0326411 | A1* | 10/2021 | Sarkar | G06F 8/10 |

OTHER PUBLICATIONS

PCT/US2021/058409, "International Search Report and Written Opinion", Mar. 2, 2022, 9 pages.

* cited by examiner

CONTINUOUS INTEGRATION AND DEVELOPMENT OF CODE IN A SECURE ENVIRONMENT

CROSS-REFERENCE TO RELATED APPLICATIONS

This application is a continuation of International Application No. PCT/US2021/058409, filed on Nov. 8, 2021, which claims the benefit of and priority to U.S. Provisional Application No. 63/111,991, filed on Nov. 10, 2020, each of which is hereby incorporated by reference in their entireties for all purposes.

FIELD

The present disclosure relates to digital and personalized healthcare, and in particular to techniques for continuous integration and continuous deployment of source code on a digital health platform.

BACKGROUND

Continuous integration (CI) is a software development practice in which adjustments to the underlying code in an application are tested as team members or developers make changes. CI speeds up the release process by enabling teams to find and fix bugs earlier in the development cycle and encourages stronger collaboration between developers. Continuous deployment (CD) is the process of getting new software builds to users as quickly as possible. It is the natural next step beyond CI and is an approach used to minimize the risks associated with releasing software and new features. As software development teams attempt to meet growing demand for faster release and increased quality and security of software, many look to a continuous development pipeline to streamline the process. Adopting a continuous integration and continuous deployment (CI/CD) approach allows for on-demand adaption of software and improvements in time to market, testing automation, security, and user satisfaction.

In healthcare, data-driven technology solutions are being developed to further personalized healthcare all while reducing costs. With the healthcare landscape shifting to an on-demand deployment system of personalized medical services and solutions, healthcare providers are looking to developers for help with innovating solutions faster through automating and streamlining the software development and service management processes. In order to support healthcare providers and services, developers have looked to distributed computing environments (e.g., cloud computing) as the healthcare information technology infrastructure standard, which is a low-cost way to develop the complex infrastructure required to support the continuous development pipeline and deployment of software within a service model (e.g., analytics-as-a-service (AaaS)). While distributed computing environments such as cloud computing afford healthcare providers many benefits, they function differently than legacy storage or information sharing solutions, and thus create their own unique privacy and security challenges. For example, because users access data through an internet connection, government regulation (e.g., Health Insurance Portability and Accountability Act (HIPAA), "good practice" quality guidelines and regulations (GxP), and General Data Protection Regulation (GDPR) compliance becomes a unique challenge for healthcare providers looking into cloud solutions to support the continuous development pipeline and deployment of software. Accordingly, there is a need for advances in compliant software development platforms, built to ensure the confidentiality, availability and integrity of protected healthcare information.

SUMMARY

In various embodiments, a computer-implemented method is provided that comprises: receiving, at a continuous integration continuous deployment (CI/CD) system, source code from a software development system, where the source code has already been validated in accordance with a first quality management system (QMS) associated with the software development system, and wherein the first QMS defines a first set of requirements for validating the source code; generating, by the CI/CD system, a profile for the source code, where the generating comprises: identifying characteristics of the source code and characteristics of data operated on by the code; and building the profile using the characteristics of the source code and the characteristics of the data operated on by the source code; classifying, by the CI/CD system, the source code into a class of code based on the profile; retrieving, by the CI/CD system, a second QMS associated with the class of code, where the second QMS defines a second set of requirements for validating the class of code; validating, by the CI/CD system, the source code in accordance with the second QMS, where the validating comprises performing code analysis to determine compliance or noncompliance of the source code with the second set of requirements; upon validation of the source code, executing, by the CI/CD system, a build process to generate a executable program from the source code; encapsulating, by the CI/CD system, the executable program in a container; and deploying, by the CI/CD system, the container on one or more nodes of a software platform.

In some embodiments, the software development system is located remotely over a network connection from the CI/CD system; and the first set of requirements is different from the second set of requirements, where the first set of requirements is defined to determine whether the source code: conforms to an intended use, performs as intended to implement the intended use, and satisfies a base level of security.

In some embodiments, the characteristics of the source code are identified by analyzing scope of source code comments and the source code, the characteristics of the source code include one or more programming languages used to write the source code, intended use of the source code, and environment in which the source code is intended to run, and the characteristics of the data operated on by the source code include type and format of data to be input to the source code and type of data and format generated by the source code.

In some embodiments, the classifying comprises: querying, using the profile, a data structure storing a plurality of profiles associated with various classes of code; identifying a plausible profile from the plurality of profiles that has a predetermined number of characteristics that match the characteristics of the source code and the characteristics of the data operated on by the source code; and classifying the source code as the class of code associated with the plausible profile.

In some embodiments, the classifying comprises using a classifier that takes as input the profile to generate an inference of the class of code based on the characteristics of the source code and the characteristics of the data operated on by the source code.

In some embodiments, the second set of requirements is defined to determine whether the source code: performs as intended to implement the intended use, satisfies an augmented level of security, satisfies requirements enforced by international, national, and/or regional regulations, satisfies data privacy concerns, and satisfies performance requirements specific to the container and the software platform environment.

In some embodiments, the method further comprises: configuring, by the CI/CD system, a first pipeline of tools to perform the code analysis in accordance with the second QMS, wherein the code analysis comprises static analysis and the configuring the first pipeline of tools comprises: identifying a set of static analysis tools that is capable of analyzing the source code to satisfy the set of requirements, determining a static testing protocol to execute the set of static analysis tools to satisfy the second set of requirements, and provisioning the set of static analysis tools within the first pipeline of tools in accordance with the static testing protocol.

In some embodiments, the method further comprises: configuring, by the CI/CD system, a second pipeline of tools to perform the code analysis in accordance with the second QMS, wherein the code analysis comprises dynamic analysis and the configuring the second pipeline of tools comprises: identifying a set of dynamic analysis tools that is capable of analyzing the source code to satisfy the second set of requirements, determining a dynamic testing protocol to execute the set of static analysis tools to satisfy the second set of requirements, and provisioning the set of dynamic analysis tools within the second pipeline of tools in accordance with the dynamic testing protocol.

In some embodiments, the static analysis determines: errors, high risk components, unexpected features, open source features, security vulnerabilities, and changes from version to version in the source code, and the dynamic analysis determines: base functionality, localization functionality, performance metrics, and security vulnerabilities.

In some embodiments, the determining the open source features comprises: identifying, by the CI/CD system, the open source features of the source code; determining, by the CI/CD system, permissions or licenses associated with the open source features; and compiling, by the CI/CD system, the permissions or licenses and the associated open source features into a data structure.

In some embodiments, the method further comprises: identifying, by the CI/CD system, a version of the source code based on the static analysis; generating, by the CI/CD system, a new executable program version comprising the source code based on the identified version of the source code; and managing, by the CI/CD system, activation and visibility of the new executable program version and/or older executable program versions comprising the source code.

In some embodiments, the method further comprises creating, by the CI/CD system, the one or more nodes on the software platform to host the executable program in the container.

In some embodiments, the method further comprises upon invalidation of the source code, providing, by the CI/CD system, the software development system with a notification that the source code is invalid, wherein the notification includes information concerning one or more reasons for the invalidation of the source code.

In some embodiments, the second set of requirements is defined in consideration of intended use of the source code being within a medical device or as a medical device.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1:
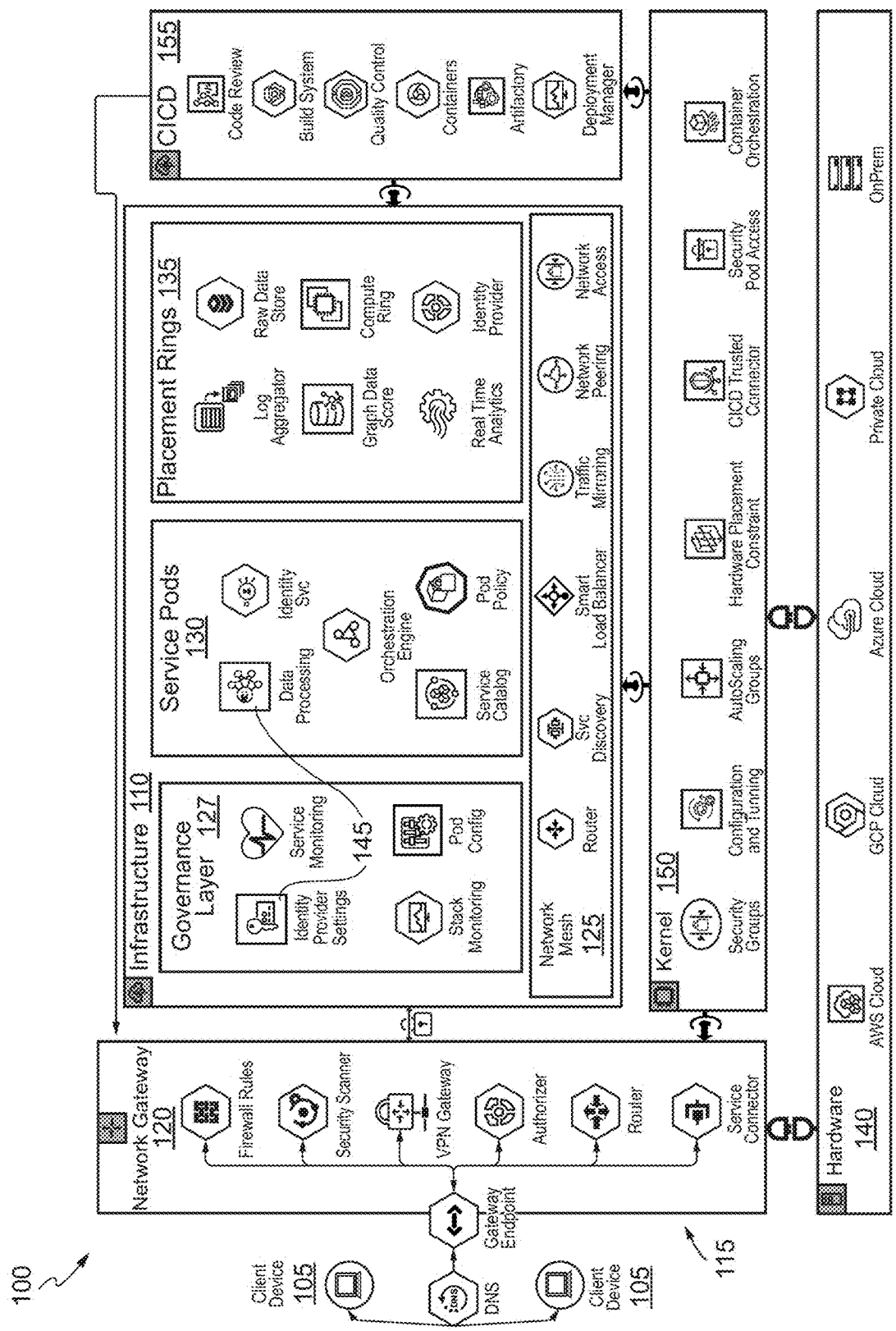
FIG. 1 depicts a diagram of a digital health platform for providing data-driven technology solutions according to various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

The present disclosure describes techniques for CI/CD of source code on a digital health platform. More specifically, embodiments of the present disclosure provide techniques for validating and deploying various classes of code (e.g., software as a medical device) in accordance with a quality management system that defines a set of requirements for validating the various classes of source code.

A Quality Management System (QMS) is a set of interrelated or interacting elements such as policies, objectives, procedures, processes, and resources that are established individually or collectively to guide an organization. In the context of this disclosure, organizations engaged in data-driven technology solutions on a digital health platform should establish, implement, monitor, and maintain a QMS that helps them ensure they meet consumers and other stakeholder needs within statutory and regulatory requirements related to a software product, service, or system. This includes verification and validation of code for checking that a software product, service, or system meets requirements and that it fulfills its intended purpose.

A requirement can be any need or expectation for a system or for its software. Requirements reflect the stated or implied needs of the consumer, and may be market-based, contractual, or statutory, as well as an organization's internal requirements. There can be many different kinds of requirements (e.g., design, functional, implementation, interface, performance, or physical requirements). Software requirements are typically derived from the system requirements for those aspects of system functionality that have been allocated to software. Software requirements are typically stated in functional terms and are defined, refined, and updated as a development project progresses.

A specification is a document that states the requirements. The specification may refer to or include drawings, patterns, or other relevant documents and usually indicates the means and the criteria whereby conformity with the requirement can be checked. There are many different kinds of written specifications, e.g., system requirements specification, software requirements specification, software design specification, software test specification, software integration specification, etc. All of these documents establish "specified requirements" and are design outputs for which various forms of verification are to be performed.

Software verification provides objective evidence that the design outputs of a particular phase of the software development life cycle meet all of the specified requirements for that phase. Software verification looks for consistency, completeness, and correctness of the software and its supporting documentation, as it is being developed, and provides support for a subsequent conclusion that software is validated. Software testing is one of many verification activities intended to confirm that software development output meets its input requirements. Other verification activities include various static and dynamic analyses, code and document inspections, walkthroughs, and other techniques.

Software validation is a part of the design validation for a finished software product, service, or system and includes confirmation by examination and provision of objective evidence that software specifications conform to user needs and intended uses, and that the particular requirements implemented through software can be consistently fulfilled. In practice, software validation activities may occur both during, as well as at the end of the software development life cycle to ensure that all requirements have been fulfilled. Since software is usually part of a larger hardware system, the validation of software typically includes evidence that all software requirements have been implemented correctly and completely and are traceable to system requirements. A conclusion that software is validated is highly dependent upon comprehensive software testing, inspections, analyses, and other verification tasks performed at each stage of the software development life cycle. Testing of software product, service, or system functionality in a simulated use environment, and user site testing are typically included as components of an overall design validation program for a software product, service, or system.

Software Development Life Cycle (SDLC) is a process used by the software industry to design, develop and test high quality software in accordance with the requirements defined by a QMS. One of the primary tasks in SDLC is verification and validation of the software source code. As used herein, "source code" means any fully executable description of a software system. It is therefore so construed as to include the version of software as it is originally written in various programming languages, machine code, or executable graphical representations of systems. When considering data-driven technology solutions in regulated environments such as health care, a robust approach to risk-based SDLC code review requires well-defined processes, use of a qualified infrastructure, validated design and deployment of software, qualified personnel, rigorous change management and version control. With the increased adoption of cloud-based applications and services, cloud computing solutions such as AaaS and Software as a Service (Saas) offer many advantages including enhanced cost-effectiveness, case of implementation, and flexible, highly scalable platforms. However, assuring data integrity and data privacy in cloud computing solutions requires a well-informed, proactive approach by the regulated entity in planning and maintaining control of their data once it is implemented in data-driven technology solutions on a cloud provider's site. This includes incorporating the proactive approach for data integrity and data privacy into their SDLC code review, which can be challenging because it requires verification and validation of software source code that in many instances was not developed by the regulated entity. For example, the developer may make a false statement concerning the identity of the programming language to directly obscure the true identity of the programming language and avoid proper code scanning, or the developer may change the file extension to indirectly obscure the true identity of the programming language and avoid proper code scanning.

To address these limitations and problems, the techniques for validation and deployment of source code by a regulated entity in the present disclosure utilize a customized approach to SDLC. This technique is intended to disconnect the developer's portion of the SDLC (in some instances a CI based approach that is developed in accordance with the developer's QMS) from that of the regulated entity's portion of the SDLC (a customized CI/CD based approach that is developed in accordance with the regulated entity's own QMS). Consequently, the developer may perform n number of iterations of their portion of the SDLC to finally release a single version of the source code, and this single version of the source code is input into the regulated entity's portion of the SDLC, which is customized for handling challenges unique to the digital health platform of the regulated entity such as data integrity and data privacy. If the source code fails validation within the regulated entity's portion of the SDLC, then the developer is notified and the developer can go back to fix whatever issues have created the validation failure and cycle through any number of additional iterations of their portion of the SDLC with the ultimate goal being to deploy the source code on the digital health platform.

One illustrative embodiment of the present disclosure is directed to a method that includes receiving, at a CI/CD system, source code from a software development system, where the source code has already been validated in accordance with a first QMS associated with the software development system, and wherein the first QMS defines a first set of requirements for validating the source code. The method further includes generating, by the CI/CD system, a profile for the source code. The generating comprises: identifying characteristics of the source code and characteristics of data operated on by the code; and building the profile using the characteristics of the source code and the characteristics of the data operated on by the source code. The method further includes classifying, by the CI/CD system, the source code into a class of code based on the profile, and retrieving, by the CI/CD system, a second QMS associated with the class of code, where the second QMS defines a second set of requirements for validating the class of code. The method further includes validating, by the CI/CD system, the source code in accordance with the second QMS, where the validating comprises performing code analysis to determine compliance or noncompliance of the source code with the second set of requirements. The method further includes upon validation of the source code, executing, by the CI/CD system, a build process to generate a executable program from the source code, encapsulating, by the CI/CD system, the executable program in a container, and deploying, by the CI/CD system, the container on one or more nodes of a software platform.

II. Digital Health Platform

FIG. 1 depicts a simplified diagram of a digital health platform 100 for providing data-driven technology solutions in accordance with various embodiments. In the illustrated embodiment, digital health platform 100 includes client computing devices 105 coupled to a cloud based infrastructure 110 via a network(s) 115 including network gateway 120 and network mesh 125. The infrastructure 110 is adapted to execute services or software applications within service pods 130 using resources provisioned within placement rings 135 by cloud service providers 140 using various hardware and cloud infrastructure (e.g., private cloud or on-premise cloud infrastructure and public cloud infrastructure). These services or software applications may be offered as web-based or cloud services, such as under an AaaS or SaaS model to users of client computing devices 105. Several providers offer cloud services such as Amazon, Google, and Oracle. The term cloud service is generally used to refer to a service that is made available to users on demand and via a communication network such as the Internet by systems (e.g., infrastructure 110) of a service provider such as a government regulated entity. Consumers may thus avail themselves of cloud services provided by a service provider without having to purchase separate licenses, support, or hardware and software resources that support the services. For example, a cloud service provider's system may host the one or more programs, and a user may, via the Internet, on demand, use the one or more programs without the user having to buy infrastructure resources for executing the one or more programs. Cloud services are designed to provide easy, scalable access to applications, resources and services.

In some instances, users (e.g., software or service consumers) operating client computing devices 105 utilize one or more client applications to consume the software products, services, or systems provided by various components 145 of the infrastructure 110. In other instances, users (e.g., developers) operating client computing devices 105 utilize one or more client applications to upload source code for the software products, services, or systems to be provided by the various components 145 of the infrastructure 110. The components 145 include software components that may be executed by one or more processors, hardware components, or combinations thereof. It should be appreciated that various different system configurations are possible, which may be different from those illustrated for the digital health platform 100. The embodiment shown in FIG. 1 is thus one example of a distributed computing environment for implementing a digital health platform and is not intended to be limiting.

The client computing devices 105 include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Fitbit Versa™ smart watch, virtual reality (VR) or augment reality (AR) systems such as magic leap 1® and Oculus®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices 105 may be capable of executing various different applications such as various Internet-related apps, communication applications (e.g., E-mail applications, short message service (SMS) applications) and may use various communication protocols.

Network(s) 115 are any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 115 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The network gateway 120 is a network node that forms a secure passage between two or more of the networks 115 operating in the same or different protocols. The network gateway 120 may provide network security using one or more of the following techniques: a firewall for monitoring incoming and outgoing network traffic, a virtual private network to provide private secure channels of communication, security scanning for identifying security flaws within the network(s), an access manager for authentication and authorization services, and the like. The network gateway 120 routes network traffic using a router and a service connecter that manages access to various software products, services, or systems (e.g., using a service subscription business model). The network mesh 125 is a local network topology in which the infrastructure 110 (e.g., bridges, switches, and other infrastructure devices) connect directly, dynamically and non-hierarchically to as many other nodes as possible and cooperate with one another to efficiently route data between devices and nodes. The network mesh 125 manages connections using one or more of the following techniques: load balancing, products, services, or systems discovery, network access, routing, and peering, traffic mirroring, and the like. The network(s) 115, network gateway 120, and network mesh 125 work in combination to manage all data that inflows or outflows from infrastructure 110.

The components 145 include one or more general purpose computers, specialized server computers (including, by way of example, PC (personal computer) servers, application specific servers, mid-range servers, mainframe computers, rack-mounted servers, etc.), server farms, server clusters, or any other appropriate arrangement and/or combination computers or systems that work individually or in combination to provide resources, data, services, or programs to client computing devices 105 over network(s) 115. The components 145 may further include one or more virtual machines running virtual operating systems, or other computing architectures involving virtualization such as one or more flexible pools of logical storage devices that can be virtualized to maintain virtual storage devices. In various embodiments, the components 145 are adapted to run one or more services or software applications that provide the functionality described in the present disclosure.

The components 145 also include one or more data repositories. These data repositories may be used to store data and other information in various embodiments. For example, one or more of the data repositories may be used to store information for providing data-driven technology solutions such as software as a medical device (SAMD) and store information for validation and deployment of source code to implement the data-driven technology solutions. The data repositories may reside in a variety of locations. For example, a data repository used by a component may be local to of the component or may be remote from the component and in communication with the component via a network-based or dedicated connection. Data repositories may be of different types. In certain embodiments, a data repository used by a component may be a database, for example, a centralized database, a distributed database, a NoSQL database, a relational database, or the like. One or more of these databases may be adapted to enable storage, update, and retrieval of data to and from the database in response to SQL-formatted commands. In certain embodiments, one or more of data repositories may also be used by applications to store application data. The data repositories used by applications may be of different types such as, for example, a key-value store repository, an object store repository, or a general storage repository supported by a file system.

The components 145 also include computing nodes adapted to run one or more programs such as services or software applications (e.g., the services or software applications offered as web-based or cloud services or the applications for implementing the CI/CD system) that provide the functionality described in the present disclosure. Each node is a representation of single machine optionally implemented within a cluster of nodes. The single machine may be a physical machine (e.g., a server in a datacenter) or a virtual machine hosted on a cloud provider such as Amazon Web Services™ (AWS) with a set of a set of CPU and RAM resources that can be utilized. In clusters, the nodes pool together their resources to form a more powerful machine. When the one or more programs are deployed onto the cluster, the cluster intelligently handles distributing work to the individual nodes. If any nodes are added or removed, the cluster can shift around work as necessary. It does not matter to the one or more programs, or the infrastructure 110, which individual machines are actually running the code.

The one or more programs deployed onto one or more clusters are packaged as containers. Containers are a widely accepted standard, and various images can be defined for deploying the one or more programs on the infrastructure 110. Containerization allows for the infrastructure 110 to create self-contained execution environments. Any program and all its dependencies can be bundled up into a single file and then shared on the infrastructure 110. Creating a container can be done programmatically, allowing for powerful fully automated CI/CD pipelines to be used for validating code and deployment of code on the infrastructure 110. The containers are wrapped into a higher-level structure known as the pod 130. Containers in the same pod 130 may share the same resources and local network. In some instances, containers can communicate with other containers in the same pod 130 as though they were on the same machine while maintaining a degree of isolation from others. The pods 130 are used as the unit of replication in the infrastructure 110. If programs or resources become overwhelmed with processing and a single pod 130 instance cannot carry the load, the infrastructure 110 may be configured to deploy new replicas of a pod 130 to the cluster as necessary. Even when not under heavy load, it may be beneficial to have multiple copies of a pod 130 running at any time in a production system to allow load balancing and failure resistance. The one or more instances of the pods 130 are provisioned on the cloud infrastructure system provided by the one or more cloud service providers 140.

The cloud infrastructure system provided by the one or more cloud service providers 140 include infrastructure resources that are utilized for facilitating the provision of the one or more instances of the pods 130 supporting various cloud services offered by infrastructure 110. To facilitate efficient utilization of these resources for provisioning the one or more instances of the pods 130, the resources may be bundled into sets of resources or resource modules (also referred to as "placement rings 135"). Each resource module or placement ring 135 may comprise a pre-integrated and optimized combination of resources of one or more types. In certain examples, different placement rings 135 may be pre-provisioned for different types of cloud services. For example, a first set of placement rings 135 may be provisioned for a SAMD service, a second set of placement rings 135, which may include a different combination of resources than placement rings 135 in the first set of placement rings 135, may be provisioned for data analytics service, and the like. For some cloud services, the resources allocated for provisioning the services may be shared between the services.

The digital health platform 100 further includes one or more kernels 150. The kernels 150 are adapted to run on each cloud infrastructure system provided by the one or more cloud service providers 140. The kernels 150 are cluster managers that provide resource allocation and isolation across distributed applications or frameworks across the entire digital health platform 100. The kernels 150 provide the one or more programs with application programming interfaces (APIs) for orchestration of services and software including resource management and scheduling. The architecture of the kernels 150 includes agent nodes for running tasks, master nodes for sending task to the agent nodes, a zookeeper for elections and for looking up address of master nodes, and frameworks to co-ordinate with the master nodes to schedule tasks onto agent nodes.

The digital health platform 100 further includes a CI/CD system 155. The CI/CD system 155 is implemented within the cloud infrastructure system and allows the digital health platform 100 to frequently update, test, and deliver changes within source code for the software products, services, or systems. As discussed in detail herein, in healthcare, there are government regulations regarding the security of data (e.g., data integrity and data privacy) to which software must adhere. In the CI/CD system 155, these policy regulations can be included in the code, allowing compliance to be tracked, validated, and reconfigured automatically. In an example of SAMD, data storage locations, server access controls, and activity logging can be included in the source code, such that user data can be protected and managed throughout use of the software. Encryption and password-protected operations can additionally be included during continuous integration. During continuous delivery, security and monitoring tools can be used to track user activity and detect errors that could lead to a security threat.

The CI/CD system 155 may also be used for provisioning machine-learning models. Machine-learning models are initially trained using a dataset, but over time, the model may drift or the data may change, leading to a need for an updated machine-learning model. If the machine-learning model runs within a software application, code associated with the software application can include triggers for when the machine-learning model should be retrained. For example, the code may include instructions for the machine-learning model to be retrained at predefined time intervals, when new training data is available, or when the performance of the machine-learning model is determined to fall below a threshold. Additionally, software developers may explore variations in model architectures and hyperparameters in a testing environment based on monitoring the performance of the machine-learning model in a production environment or based on estimated improvements for model optimization. The CI/CD system 155 allows for easy building, testing, and deployment to a production environment when the machine-learning model is determined to meet performance requirements.

III. CI/CD System

Figure 2:
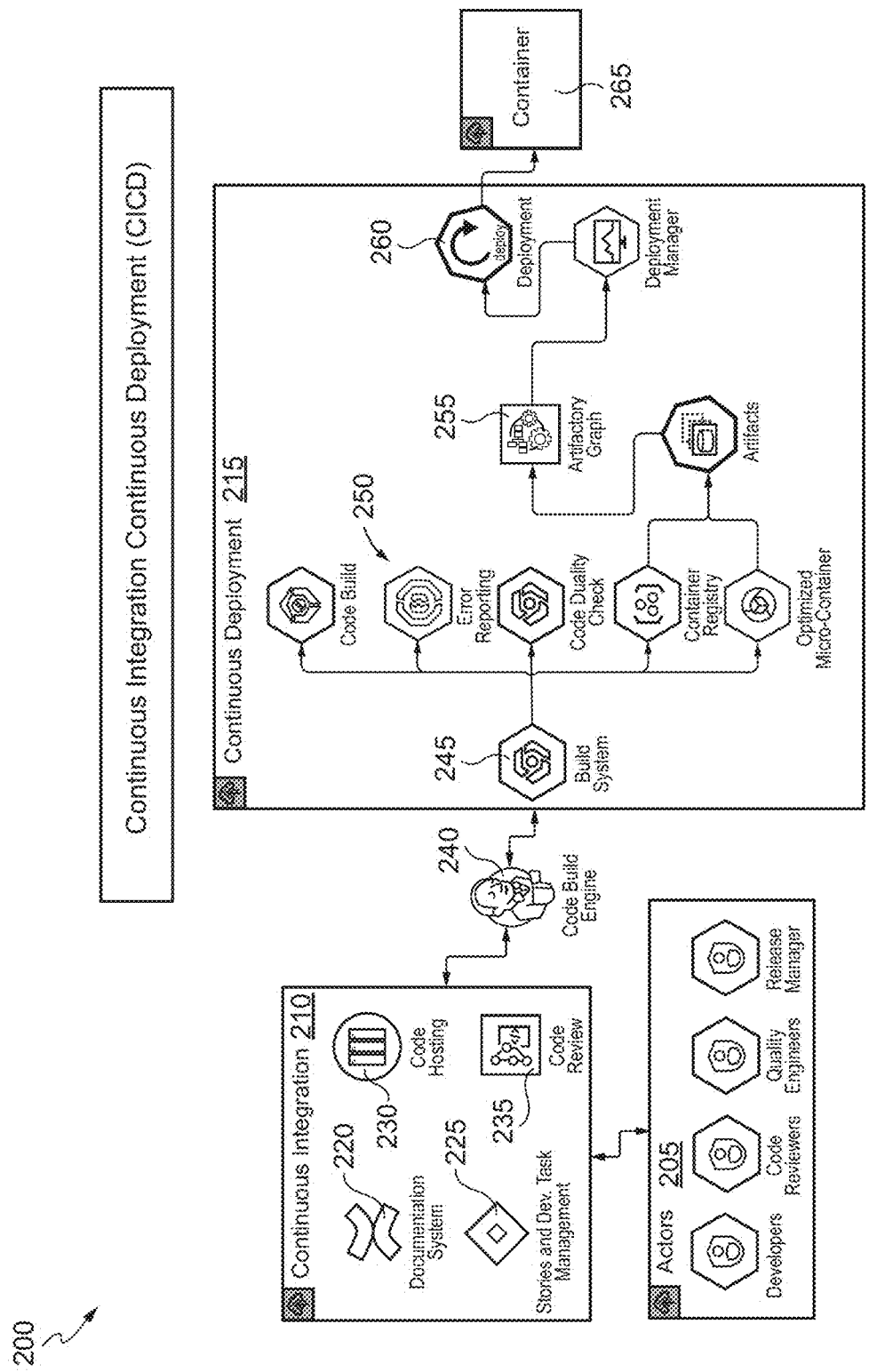
FIG. 2 depicts a diagram of a CI/CD system according to various embodiments.

FIG. 2 depicts a simplified diagram of a CI/CD system 200 (e.g., the CI/CD system 155 described with respect to FIG. 1) for validating and deploying various classes of code in accordance with various embodiments. In the illustrated embodiment, CI/CD system 200 includes actors 205, a CI component 210, and a CD component 215. The actors 205 may include software developers, code reviewers, quality engineers, release managers, and/or service providers such as the government regulated entity. The actors 205 upload source code for verification, validation, and deployment to the CI/CD system 200 via one or more client devices (e.g., the client devices 105 described with respect to FIG. 1). As illustrated, the actors 205 and their associated portion of the SDLC are physically separate from that of the regulated entity's portion of the SDLC (the CI component 210 and CD component 215). Consequently, the actors 205 may perform n number of iterations of their portion of the SDLC to finally release a single version of the source code, and this single version of the source code is input into the CI component 210 and CD component 215, which are customized for handling challenges unique to the digital health platform of the regulated entity such as data integrity and data privacy. If the source code fails validation within the CI component 210 and/or CD component 215, then the actors 205 are notified and the actors 205 can go back to fix whatever issues have created the validation failure and cycle through any number of additional iterations of their portion of the SDLC with the ultimate goal being to deploy the source code on a software platform (e.g., a digital health platform 100 of a government regulated entity as described with respect to FIG. 1).

The CI component 210 includes a documentation system 220 for maintaining various QMSs, code profiles, and code review records, a task management system 225 for profiling source code and orchestrating code review tasks, a code hosting platform 230 for version control and collaboration, and a code review system 235 for performing static analysis of the source code. When submitting source code, actors 205 build the source code out as a unique set of code changes and then push that unique set of code changes to the CI component 210. In accordance with various aspects of the present disclosure, the source code uploaded to the CI component 210 is typically already validated in accordance with a QMS associated with a software development system (e.g., the software development system of third party developers). The task management system 225 is adapted to automatically identify the class of the source code that is being uploaded to the CI component 210 such that the CI component 210 can efficiently and accurately verify and validate the source code. Specifically, the task management system 225 is adapted to generate a profile for the source code in order to identify the class of the source code, identify a QMS specifically configured for the identified class of the source code, and configure an optimal set of code review tasks in accordance with a set of requirements defined by the identified QMS for verifying and validating the source code.

As should be understood, there are many different types or classes of source code and software that can be released to the CI component 210 and CD component 215 of a software platform from the actors 205. Consequently, the task management system 225 is designed to verify and validate all of the different types or classes of source code and software released to the CI/CD system 200. Moreover, the intents of the actors 205 may not always be known or aligned with those of the software platform. For example, some of the actors 205 may be trying to attack the software platform by uploading malicious code for hijacking secure sessions, stealing data, exploiting sensitive private data, obtaining security credentials of users, crashing the network or software platform, and the like. In order to hide their intents some of the actors 205 may make false statements concerning the identity of the source code to directly obscure the true identity of the source code and avoid proper code scanning, or some of the actors 205 may change the file extensions to indirectly obscure the true identity of the source code and avoid proper code scanning. Thus, the task management system 225 is adapted to classify the received source code regardless of the intent of the actors and identify a QMS that defines a set of requirements for validating the source code that is specific to the class of the source code. The set of requirements may be defined to determine whether the source code: performs as intended to implement the intended use, satisfies an augmented level of security, satisfies requirements enforced by international, national, and/or regional regulations, satisfies data privacy concerns, and satisfies performance requirements specific to the container and the software platform environment. The identified QMS allows for the CI/CD system 200 to verify, validate, and deploy the source code in an efficient, effective, and safe manner.

The task management system 225 retrieves the identified QMS from the documentation system 220, and forwards the identified QMS, the optimal set of code review tasks, and the source code to the code hosting platform 230. The code review system 235 then performs code verification in accordance with the optimal set of code review tasks. The optimal set of code review tasks define a series of tests to be run against the source code. The code review system 235 includes static analysis tools that perform the series of tests to analyze the source code. The code review system 235 determines compliance or noncompliance of the source code with the set of requirements based on results of the series of tests run against the source code. Thereafter, the code review system 235 determines validity of the source code based on the compliance or noncompliance of the source code with the set of requirements. Upon compliance and/or validation of the source code, the code hosting platform 230 releases the source code to the CD component 215 for code building and further testing (e.g., static analysis, dynamic analysis, and/or white sourcing). The release includes forwarding the source code and optionally the identified QMS and the optimal set of code review tasks to a code build tool or engine 240.

The CD component 210 includes a code build tool or engine 240 for managing the code build, a code build system 245 for building the code, a code review system 250 for performing static and dynamic analysis of the source code, an artifactory 255 for storing build artifacts, and a deployment manager 260 for encapsulating the executable program/artifacts in a container and deploying the executable program/artifacts in the container on a software platform. The code build tool or engine 240 is adapted for automating the creation of a software build and the associated processes including: compiling computer source code into binary code, packaging binary code, and running automated tests. The code build system 245 is adapted for performing a full build, which performs a build from scratch, or an incremental build, which builds using the last built state, maintained internally by the code build engine 240, to perform a build based on changes in the project since the last build state. The full or incremental build includes fetching the code from the code build engine 240 or code repository, compiling the code (including checking dependencies), running the automated tests with code review system 250, linking libraries, code, files, etc. accordingly, and once validated, building the artifacts and storing them (store build logs as well).

The code review system 250 performs code verification in accordance with the optimal set of code review tasks. The optimal set of code review tasks define a series of tests to be run against the source code (the series of tests can be the same or similar tests run on the source code prior to the build, different tests, or a combination thereof). The code review system 250 includes static and dynamic analysis tools that perform the series of tests to analyze the source code. The code review system 250 determines compliance or noncompliance of the source code with the set of requirements based on results of the series of tests run against the source code. In some instances, the code review system 250 determines validity of the source code based on the compliance or noncompliance of the source code with the set of requirements. Upon compliance and/or validation of the source code, the code build system 245 builds and stores the artifacts along with the developed software in the artifactory 255. An artifact is one of many kinds of tangible by-products produced during the development of the software. Some artifacts (e.g., use cases, class diagrams, and other Unified Modeling Language (UML) models, requirements and design documents) help describe the function, architecture, and design of the software. In certain instances, the artifacts include the source code compiled for testing, because the executable is necessary to carrying out the testing plan.

The deployment manager 260 encapsulates or packages the software in one or more containers using one or more customized pre-built images and wraps the one or more containers in a pod. The deployment manager 260 also creates a node or a cluster of nodes supported with sets of resources or resource modules (e.g., placement rings 135 as described with respect to FIG. 1) within one or more distributed computing environments 265 (e.g., cloud computing). The deployment layer 260 directly or indirectly (via one or more deployment layers of abstraction) launches the pod on the node or cluster of nodes. The deployment layer is adapted to monitor the pods, determine how many replicas of the pod are to be running on the node or cluster of nodes, and add/replace pods as necessary. The deployment manager 260 registers the software or service supported by the software (e.g., publishes the software or service) and opens up a secure channel of communication for users to access the software or service.

IV. Techniques for CI/CD of Source Code on a Digital Health Platform

Figure 3:
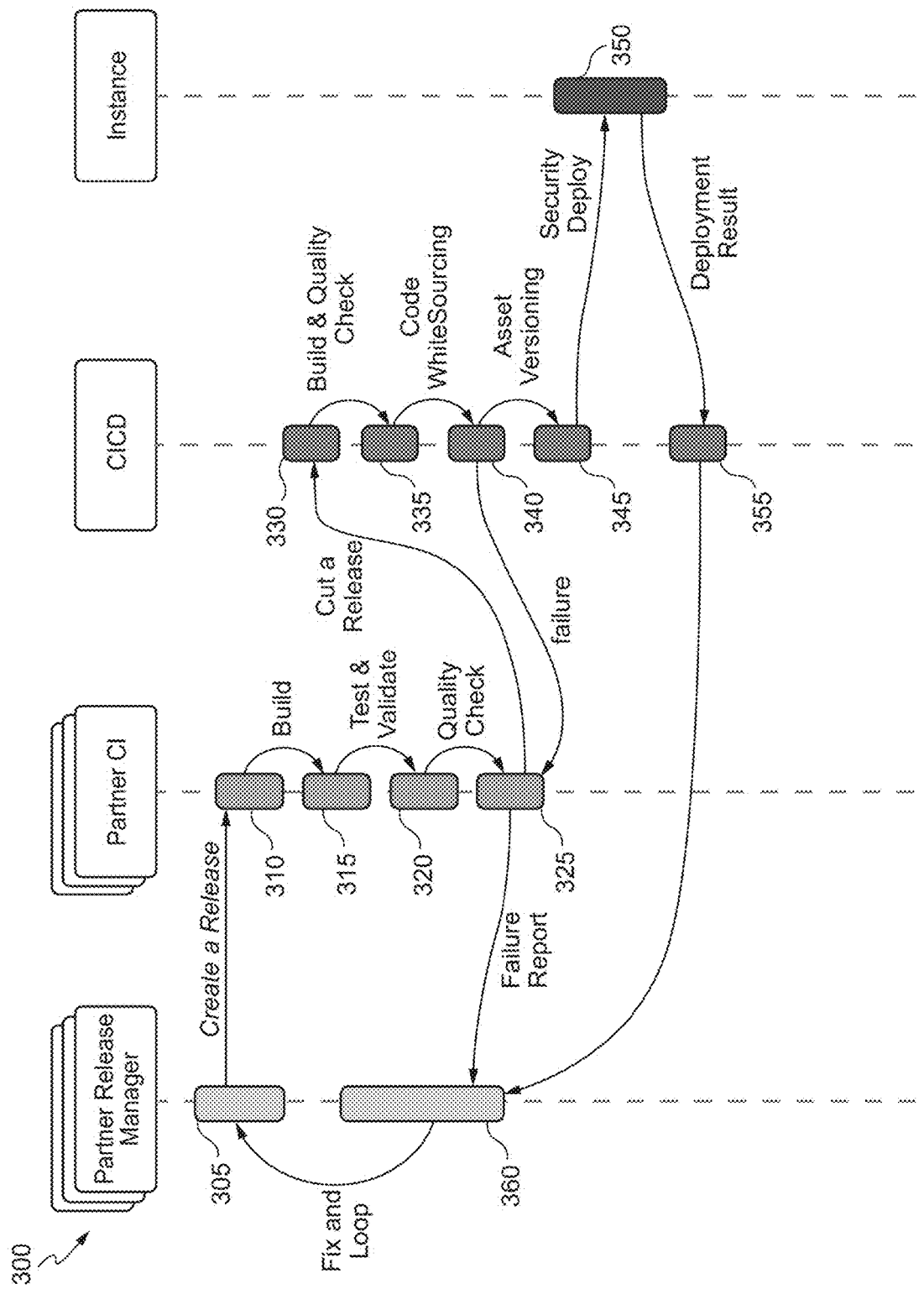
FIG. 3 depicts a swim lane diagram illustrating a process for deploying integrating, developing, and deploying code in a digital health platform according to various embodiments.
Figure 4:
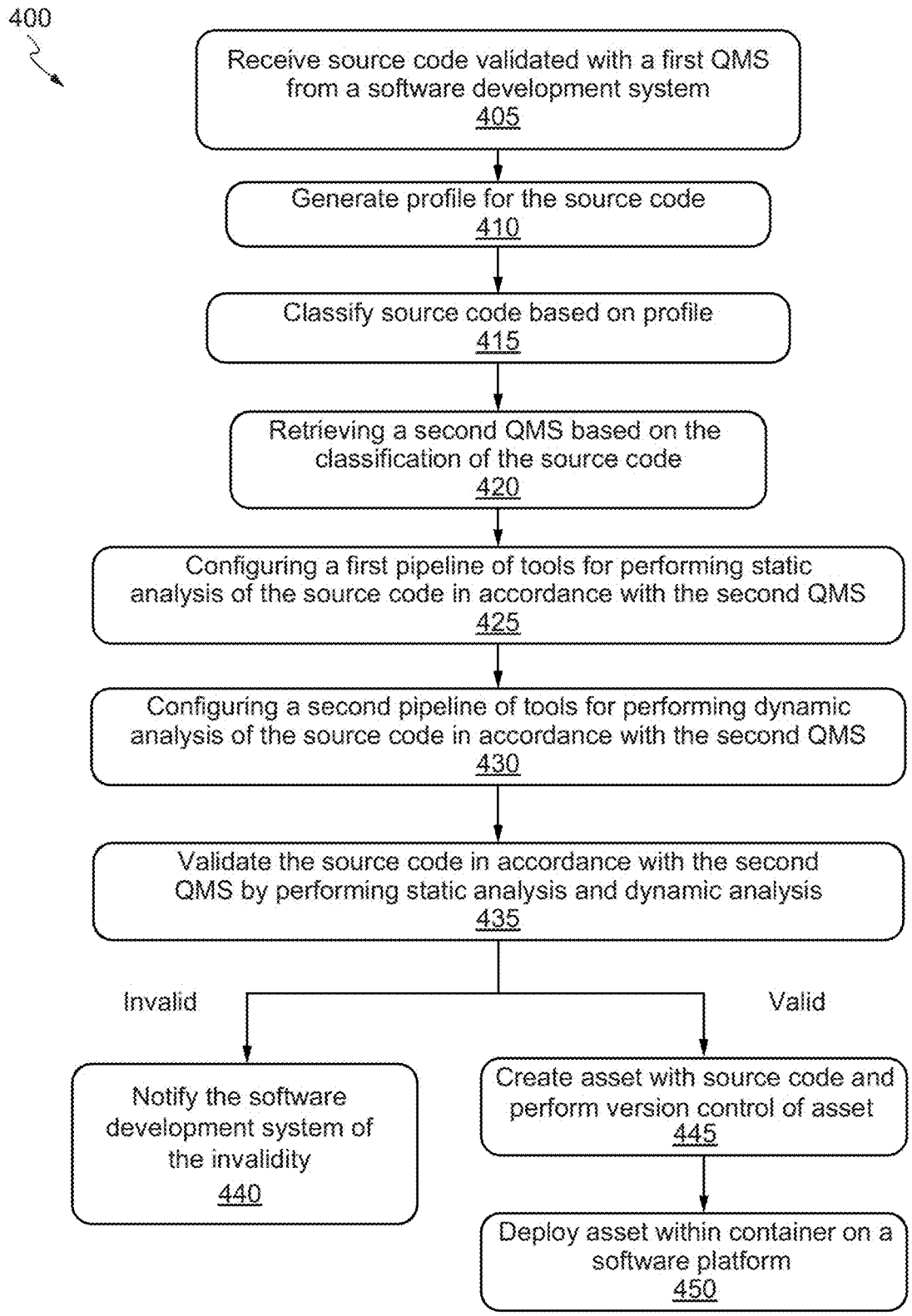
FIG. 4 depicts a flowchart illustrating a process for integrating, developing, and deploying code according to various embodiments.

FIGS. 3-4 illustrate processes and operations for validating and deploying source code. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIGS. 3-4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 3-4 is not intended to be limiting. Other sequences of steps may also be performed according to alternative embodiments. For example, in alternative embodiments the steps outlined above may be performed in a different order. Moreover, the individual steps illustrated in FIGS. 3-4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 illustrates a process 300 of using a CI/CD system to validate and deploy source code on a software platform. The processes depicted in flowchart 300 are implemented by the architecture, systems, and techniques depicted in FIGS. 1 and 2. At step 305, a release manager of a software development system creates a release of source code. The release constitutes a partly or fully functional version of source code or software that the release manager intends to build and deploy on a software platform. As illustrated, there may be multiple release managers associate with one or more software development systems (i.e., actors). Each release manager may create one or more releases of source code for build and deployment. The software development systems release the source code for verification, validation, and deployment to the CI/CD system of a software platform (e.g., a digital health platform 100 of a government regulated entity as described with respect to FIG. 1).

At step 310, the CI of the software development system associated with a given release manager retrieves the source code for the deployment and executes a build process to build the executable program. The build process is executed to convert the source code into a stand-alone form or artifacts (e.g., an efficient executable program) that can be run on a computing device. The build process is the combination of several activities that varies for each programming language and operating systems but the basic concept will be the same. The source code will be fetched and any artifacts thereof from a repository, the code will be compiled with a check for dependencies, automated tests will be run to confirm operability, the files, libraries, and code will be respectively linked, upon successful testing, artifacts representative of the executable program will be finalized and stored, and build logs will be recorded.

At step 315, the CI of the software development system tests and validates the source code and executable program in accordance with QMS of the software development system. For example, each software development system may establish a software life cycle model for validating their software that has been developed within the framework of a QMS that is appropriate for the release manager's product and organization. The QMS defines a set of requirements for validating the source code. For example, the set of requirements may be defined to determine whether the source code: conforms to an intended use, performs as intended to implement the intended use, and satisfies a base level of security. For each of the software life cycle activities, there are tasks that can be performed that support a conclusion that the software is validated. However, the tasks to be performed, their order of performance, and the iteration and timing of their performance is dictated by the specific software life cycle model that is selected and the safety risk associated with the software application as perceived individually for the software development system. Each task for validating the software typically starts with a requirement, for example, for each feature of the software, the actor should be able to point to a requirement that explains the function. Further, for each requirement, the actor should have a plan for testing that feature to make sure it is capable of functioning as required and a record keeping system for recording evidence that the plan was executed and results of the testing.

At step 320, the CI of the software development system checks the quality of the source code. The code quality check includes checking for reliability (e.g., determining whether the code performs as intended with minimal defects), maintainability (e.g., follows a consistent structure/style, is easy to understand, is well documented, etc.), and testability (e.g., how well the software supports testing efforts for verification/validation). At step 325, a determination is made as to whether the source code and executable program are valid and/or are of sufficient quality. If the source code and executable program are invalid (do not meet all or a portion of the requirements of the QMS) and/or the source code and executable program are of poor quality (as defined and measured by the software development system in accordance with the QMS), then the CI of the software development system forwards the source code back to the development team to fix the failures and/or quality of the source code. In contrast, if the source code and executable program are valid (meet all or a portion of the requirements of the QMS) and/or the source code and executable program are of good quality (as defined and measured by the software development system in accordance with the QMS), then the CI of the software development system cuts a release of the source code to the software platform.

At step 330, the CI/CD system of the software platform receives the source code and automatically identifies the QMS to be used for verification, validation, and deployment of the source code. For example, the entity controlling the software development system and their associated portion of the SDLC are separate from that of the entity controlling the CI/CD system and their associated portion of the SDLC. Consequently, the entity controlling the software development system may perform n number of iterations (e.g., steps 305-320) of their portion of the SDLC to finally release a single version of the source code, and this single version of the source code is received at step 330. This physical separation between the software development system and the CI/CD system allows for the CI/CD system to be customized for handling challenges unique to the software platform such as data integrity and data privacy, while also providing an additional layer of privacy and security between the software development system and the CI/CD system.

In some instances, the entity controlling the CI/CD system is the same or different from that of the entity controlling the software development system. In either event, the source code has already been validated in accordance with the QMS of the software development system. However, as should be understood, there are many different types or classes of source code and software that can be released to the software platform from the various software development systems. For example, one software development system may be developing SAMD, another software development system may be developing machine-learning models for image processing, another software development system may be developing software to be implemented within a medical device, another software development system may be developing software to be used for validating medical devices or SAMD, and the like. Consequently, the QMS of the software platform is designed to verify and validate all of the different types or classes of source code and software released to the CI/CD system.

Moreover, the intents of the actors may not always be known or aligned with those of the software platform. For example, some actors may be trying to attack the software platform by uploading malicious code for hijacking secure sessions, stealing data, exploiting sensitive private data, obtaining security credentials of users, crashing the network or software platform, and the like. In order to hide their intents the actors may make false statements concerning the identity of the source code to directly obscure the true identity of the source code and avoid proper code scanning, or the actors may change the file extensions to indirectly obscure the true identity of the source code and avoid proper code scanning. Thus, the CI/CD system is adapted to classify the received source code regardless of the intent of the actors and identify a QMS that defines a set of requirements for validating the source code that is specific to the class of the source code. The set of requirements may be defined to determine whether the source code: performs as intended to implement the intended use, satisfies an augmented level of security, satisfies requirements enforced by international, national, and/or regional regulations, satisfies data privacy concerns, and satisfies performance requirements specific to the container and the software platform environment. The identified QMS allows for the CI/CD system to verify, validate, and deploy the source code in an efficient, effective, and safe manner.

Once the QMS is identified, the CI/CD system of the software platform performs quality and compliance checking of the source code. The quality and compliance checking includes a build process to build the executable program, and both verification and validation of the source code and executable program. The build process is executed to convert the source code into a stand-alone form or artifacts (e.g., an efficient executable program) that can be run on a computing device, as described with respect to 310. The verification is performed to ensure that the source code or executable program is being built according to the requirements. In other words, to ensure that the source code or executable program meet their specified requirements. The validation is performed to ensure that the source code or executable program actually meets the user's needs and that the specifications were correct in the first place. In other words, to demonstrate that the source code or executable program fulfills additional requirements including specified needs when placed in its intended environment. The performance of the quality and compliance checking includes a number of sub processes including development of a test plan, execution of the test plan, and recordation of execution of the test plan. The test plan for the source code is developed automatically by the CI/CD system in accordance with the QMS. For example, the CI/CD system is aware of all types of verification and validation task that can be performed by the system including static and dynamic analysis for testing features of the source code, and the CI/CD system is aware of all requirements of the features that need to be assessed for validation of the source code via the identified QMS. Therefore, the CI/CD system will develop a test plan that includes the tasks to be performed, order of performance of the tasks, the iteration and timing of task performance, and a pipeline of tools for testing the features of the source code.

The test plan is executed by the CI/CD system using the pipeline of automated code review tools. Generally the tools can be classified into one of two groups based on the type of analysis being performed: dynamic analysis or static analysis. Dynamic analysis is performed on executable code of a compiled program and checks only user-specific behavior. That is, only the code (e.g., object code), executed during a test is checked. A dynamic analyzer can provide the user with information on memory leaks, program's performance, call stack, etc. Static analysis allows checking program code (e.g., source code) before the tested program is executed. A compiler typically performs static analysis during the compilation process. However, in large, real-life projects it is often necessary to perform static analysis through-out development to ensure the source code fulfills additional requirements including reliability, maintainability, readability, testability, portability, and vulnerability. There are many different analysis techniques implemented by dynamic and static analyzers, such as abstract syntax tree (AST) walker analysis, dataflow analysis, path-sensitive data flow analysis, etc. These different analysis techniques will be organized and executed in accordance with the test plan.

The different analysis techniques are evaluated to determine verification (quality and compliance or noncompliance) of the source code with the requirements defined within the QMS. In other words, to ensure that the source code or software meet their specified requirements. In some instances, the quality and compliance or noncompliance determination is an all or nothing determination, e.g., the source code must meet all requirements to be considered to have adequate quality and compliance. In other instances, the compliance or noncompliance determination is flexible, e.g., the source code must meet a certain percentage or threshold number of the requirements to be considered to have adequate quality and compliance. If the different analysis techniques demonstrate that the source code has adequate quality and compliance, then validity of the source code will be determined in accordance with the requirements (e.g., the user's needs and that the specifications were correct in the first place) defined within the QMS. In contrast, if the different analysis techniques demonstrate that the source code does not have adequate quality and compliance, then a notification may be sent to the actor and/or administrators of the software platform. The notification identifies the source code and the reasons for the failed verification. The execution of the test plan and results of the verification are recorded in a manner to maintain traceability between feature requirements, test plan for the feature requirements, and evidence supporting the test plan was executed. The record will be maintained in a repository for future use, e.g., to support government regulatory review.

The different analysis techniques are evaluated to determine validity of the source code in accordance with the requirements (e.g., the user's needs and that the specifications were correct in the first place) defined within the QMS. In some instances, the validity determination is an all or nothing determination, e.g., the source code must meet all requirements to be considered valid. In other instances, the compliance or noncompliance determination is flexible, e.g., the source code must meet a certain percentage or threshold number of the requirements to be considered valid. If the different analysis techniques demonstrate that the source code is valid, then the source code is passed to block 320 for determination of white sourcing. In contrast, if the different analysis techniques demonstrate that the source code is not valid, then a notification may be sent to the actor and/or administrators of the software platform. The notification identifies the source code and the reasons for the failed validation. The execution of the test plan and results of the validation are recorded in a manner to maintain traceability between feature requirements, test plan for the feature requirements, and evidence supporting the test plan was executed. The record will be maintained in a repository for future use, e.g., to support government regulatory review.

The requirements for verification and validation include one or more of the following: performing as intended to implement the intended use, satisfying requirements enforced by international, national, and/or regional regulations, satisfying data integrity and privacy concerns, satisfying performance requirements specific to the container and the software platform environment, and satisfying an augmented level of security. The intended use requirement evaluates whether the overall functionality of the various features is performing as intended to implement the overall intended use of the source code or software (e.g., image processing for tumor detection). The international, national, and/or regional regulation requirements evaluate whether government regulations (e.g., national security, cybersecurity, software malfunction, data privacy, etc.) specific to the software platform are being satisfied. In some instances, these regulation requirements are dictated based upon the international, national, and/or regional region in which the source code and or data used by the source code is deployed and used. The data integrity and privacy requirements evaluate whether the protection of data from unauthorized access and corruption is being satisfied. In some instances, the data integrity and privacy requirements are dictated based upon the international, national, and/or regional region in which the source code and or data used by the source code is deployed and used. The performance requirements specific to the container and the software platform evaluate whether the isolation of assets and data is being satisfied.

The augmented level of security requirement evaluates whether security features are functioning to prevent or minimize vulnerability concerns specific to the software platform. For example, the QMS of the software development systems may define a base line level of security that all of their source code or software should meet to address common vulnerabilities such as SQL injection, OS command vulnerabilities, buffer overflow, uncontrolled form strings, integer overflow, and the like. However, the QMS for the software platform may define an augmented level of security that all source code or software deployed on the software platform should meet to address specific vulnerabilities that are unique to the software platform. For example, the augmented level of security may include requirements to maintain separation among tenants, applications, clusters, etc. to avoid an attacker from gaining access from one application's assets or data to another application's assets or data, requirements for complete and verifiable data deletion, requirements regarding exposure of APIs, requirements for data recovery due to lost or stolen encryption keys, restrictions concerning insider abuse of authorized access, restrictions for use of unauthorized cloud services, and the like.

At step 335, the CI/CD system performs white sourcing of the source code. The white sourcing identifies open source components in the source code or software, including dependencies, and compiles the open source components into a data structure. In some instances, the white sourcing further: (i) identifies permissions or licenses associated with the open source components, (ii) identifies vulnerabilities due to open source components (e.g., vulnerabilities arising from permissions or licenses associated with the open source components), (iii) enforces license policies throughout the SDLC, and (iv) compiles the permissions or licenses, vulnerabilities, and the associated open source components into the data structure. In some instances, white sourcing prioritizes vulnerabilities based on whether the source code utilizes the vulnerabilities or not, in order to stratify risk management.

At step 340, a determination is made as to whether the source code and executable program are valid and/or include vulnerabilities due to open source components. If the source code and executable program are invalid (do not meet all or a portion of the requirements of the QMS) and/or the source code and executable program include vulnerabilities due to open source components (as defined and determined by the software platform in accordance with the QMS), then the CI/CD system forwards the source code back to the development team to fix the failures and/or vulnerabilities of the source code. In contrast, if the source code and executable program are valid (meet all or a portion of the requirements of the QMS) and/or the source code and executable program do not include vulnerabilities due to open source components (as defined and determined by the software platform in accordance with the QMS), then the CI/CD system proceeds with a deployment process for the source code or software.

At step 345, the CI/CD system performs version control and creates/stores artifacts in an artifactory. Version control keeps track of every modification to the source code in a code repository. For example, the version control system will maintain a complete long-term change history of every file. This means every change made by many individuals or actors over the lifetime of the source code or software. Changes include the creation and deletion of files as well as edits to their contents. The version control system also allows for branching and merging of multiple streams of work on the source code or software. Further, the version control system allows for traceability of each change made to the source code or software and connect it to an actor with an annotated reason or intent for the change such as a bug/error. Artifacts are created and stored to an artifactory or universal repository. The artifactory manages the end-to-end artifact lifecycle and supports different source code and software package management systems while providing consistency to the CI/CD system and workflow. The artifact repository is both a source for artifacts needed for a build process, and a target to deploy artifacts generated in the build process.

At step 350, the executable program is encapsulated in a container and deployed as a pod instance on one or more nodes of the software platform. Upon deployment of the executable program, a notification of the deployment of the pod instance for the executable program is provided to the CI/CD system. At block 355, the CI/CD system receives the notification of the deployment of the pod instance and forwards the notification to the release manager. At step 360, the process at the release manager loops back in order to allow the development team to fix the failures and/quality of the source code.

FIG. 4 illustrates a process 400 of using a CI/CD system to validate and deploy source code on a software platform. The processes depicted in flowchart 400 are implemented by the architecture, systems, and techniques depicted in FIGS. 1 and 2. At step 405, source code validated with a first QMS from a software development system is accessed. The source code is accessed from a CI/CD system of a software platform. In some instances, the software development system is located remotely over a network connection from the CI/CD system. The first QMS defines a first set of requirements for validating the source code. In some instances, the first set of requirements is adapted to determine one or more of the following: whether the source code conforms to an intended use, performs as intended to implement the intended use, and satisfies a base level of security. The first QMS is customized for handling broad challenges faced by software developers in developing quality source code, e.g., defined to ensure a software developer meets consumers and other stakeholder needs related to a software product, service, or system. This includes verification and validation of code for checking that a software product, service, or system meets the first set of requirements.

At step 410, a profile for the source code is generated. The profile is generated by: (i) identifying characteristics of the source code and characteristics of data operated on by the code, and (ii) building the profile using the characteristics of the source code and the characteristics of the data operated on by the code. The characteristics of the source code may be identified by analyzing scope of source code comments on the source code and by analyzing the technology used by the code (e.g., Java or mobile platforms). The characteristics of the source code may include one or more programming languages used to write the source code, intended use of the source code, environment in which the source code is intended to run, environment in which the source code was developed (e.g., country of origin), and the like. The characteristics of the data operated on by the source code may include type and format of data to be input to the source code and type of data and format generated by the source code. For example, type and format may include whether the data is streaming data, model training data, data with integrity and privacy concerns, data compiled from SAMD, historical or archived data, and the like.

At step 415, the source code is classified into a class of code based on the profile. The classifying may include querying, using the profile, a data structure storing profiles associated with varying classes of code. A plausible profile may be identified from the profiles that have a predetermined number of characteristics that match the characteristics of the source code and the characteristics of the data operated on by the source code. For example, the query may be used to identify a set of profiles that have a predetermined number of characteristics that match the characteristics of the source code and the characteristics of the data operated on by the source code. The set of profiles may be sorted using one or more sort properties such as a number of characteristics that match, a relevance value, a strength of matching value, and the like. The profile at the top or bottom of the list of the set of profiles may then be identified as the plausible profile. The source code may be classified as the class of code associated with the plausible profile. Alternatively, classifying may include using a classifier that takes as input the profile to generate an inference of the class of code based on the characteristics of the source code and the characteristics of the data to be operated on by the source code. Advantageously, the classifying processes in steps 410 and 415 allow for many different types or classes of source code and software to be validated and deployed. Moreover, because the source code is classified irrespective of the class assigned by the software developer/software development system, a second QMS for the class of code classified in step 415 may be retrieved that allows for the CI/CD system to verify, validate, and deploy the source code in an efficient, effective, and safe manner.

At step 420, a second QMS is retrieved for the class of code determined in step 515. The second QMS defines a second set of requirements for validating the class of code. In some instances, the first set of requirements is different from the second set of requirements. The second set of requirements may include determining whether the source code performs as intended to implement the intended use (e.g., within a medical device or as a medical device), satisfies an augmented level of security, satisfies requirements enforced by international, national, and/or regional regulations, satisfies data privacy concerns, and satisfies performance requirements specific to a container and a software platform environment. In certain instances, the second set of requirements is defined in consideration of intended use of the source code being within a medical device or as a medical device. that The second QMS is customized for handling more specific challenges faced by software providers such as a government regulated entity in providing quality source code, e.g., defined to ensure a software provider meets consumers and other stakeholder needs within statutory and regulatory requirements related to a software product, service, or system. This includes verification and validation of code for checking that a software product, service, or system meets the second set of requirements. This physical separation between the software development system and the CI/CD system allows for the CI/CD system and the second QMS to be customized for handling these more specific challenges unique to the software platform.

Figure 5:
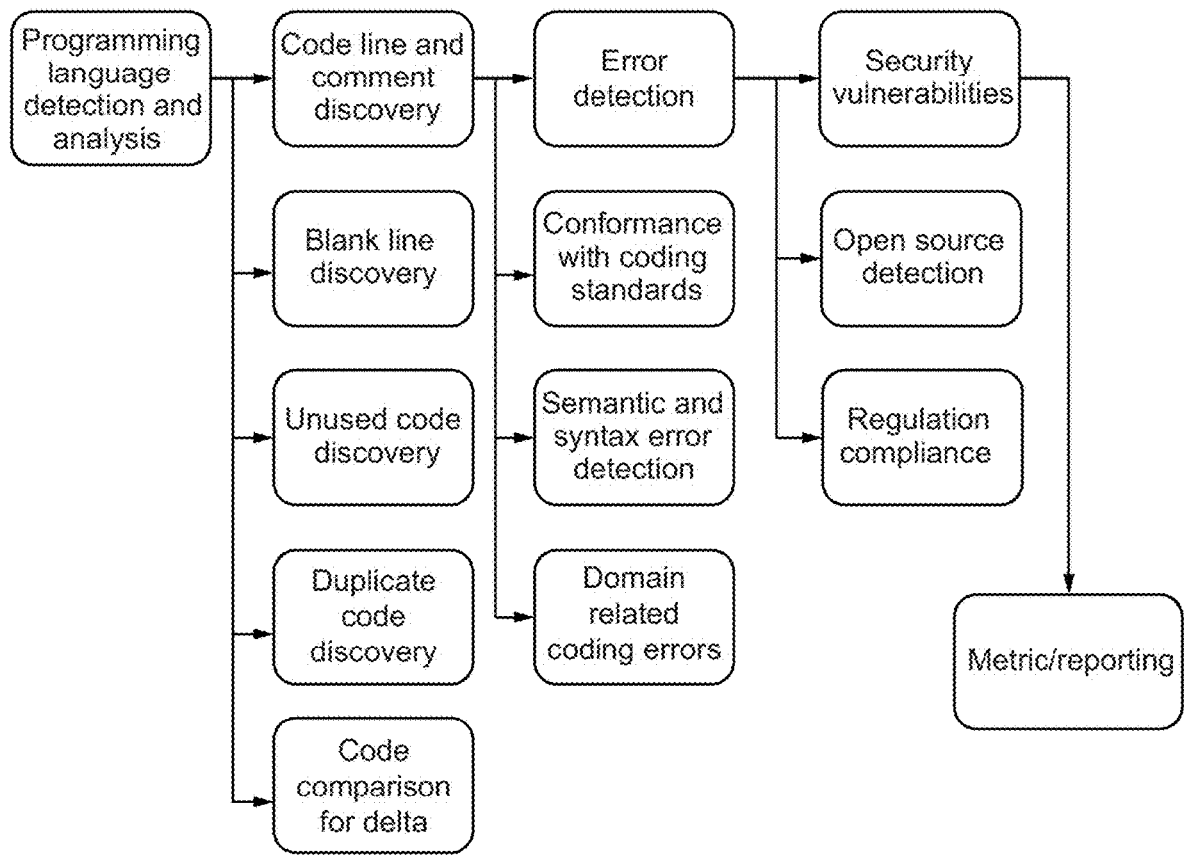
FIG. 5 shows an example pipeline of identified tools and a static testing protocol for executing the tools according to various embodiments.

At step 425, a first pipeline of tools is configured for performing the code analysis in accordance with the second QMS. The code analysis includes static analysis. The configuring the first pipeline of tools includes: (i) identifying a set of static analysis tools that is capable of analyzing the source code to satisfy the second set of requirements, (ii) determining a static testing protocol to execute the set of static analysis tools to satisfy the second set of requirements, and (iii) provisioning the set of static analysis tools within the first pipeline of tools in accordance with the static testing protocol. FIG. 5 shows an example pipeline of identified tools and a static testing protocol for executing the tools. The static testing protocol defines parameters, an order of execution of the set of static analysis tools, and criteria for determining compliance or noncompliance of the source code with the second set of requirements. The static testing protocol includes initially analyzing and detecting the programming language of the source code, and based on the detected programming language, performing one or more of the following: discovery of code and comments, discovery of blank lines, discovery of unused code, discovery of duplicate code, and comparison of code for deltas. Thereafter, the static testing includes performing one or more of the following: error detection within the code, determination of conformance of code with coding standards, detection of semantic and syntax errors, and detection of domain related coding errors. Thereafter, the static testing protocol includes performing one or more of the following: identifying security vulnerabilities, detection of open source components, and determination of whether the code is compliant with various third party regulations (e.g., government regulations such as HIPAA). Lastly, the static testing protocol compiles the output of the various tools and generates metrics and a reporting for ultimately determining whether the source code is validated in accordance with the second QMS. As should be understood, the tools and a static testing protocol illustrated in FIG. 5 are merely exemplary and any number and type of static analysis tools may be used and various static testing protocols may be configured for executing the tools and performing the code analysis in accordance with the second QMS.

Figure 6:
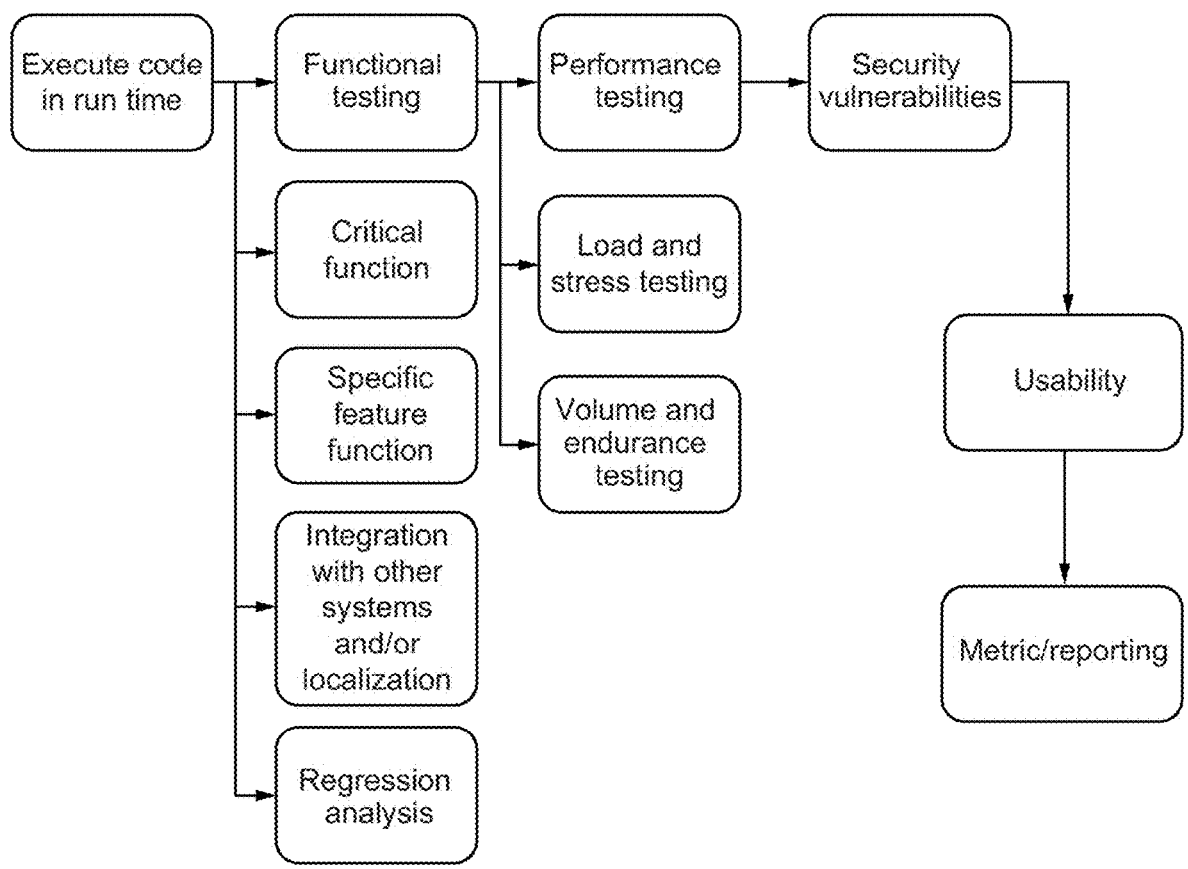
FIG. 6 shows an example pipeline of identified tools and a dynamic testing protocol for executing the tools according to various embodiments.

At step 430, a second pipeline of tools is configured for performing the code analysis in accordance with the second QMS. The code analysis includes dynamic analysis. The configuring the second pipeline of tools includes: (i) identifying a set of dynamic analysis tools that is capable of analyzing the source code to satisfy the second set of requirements, (ii) determining a dynamic testing protocol to execute the set of dynamic analysis tools to satisfy the second set of requirements, and (iii) provisioning the set of dynamic analysis tools within the second pipeline of tools in accordance with the dynamic testing protocol. FIG. 6 shows an example pipeline of identified tools and a dynamic testing protocol for executing the tools. The dynamic testing protocol can define parameters, an order of execution of the set of dynamic analysis tools, and criteria for determining compliance or noncompliance of the source code with the second set of requirements. The dynamic testing protocol includes initially executing the code or executable program in run time, and based on the execution, performing one or more of the following: functional testing, testing for critical functions, testing for function of specific features, testing for compatibility and integration with other systems and/or localization, and regression analysis. Thereafter, the dynamic testing includes performing one or more of the following: performance testing, load and stress testing, and volume and endurance testing. Thereafter, the dynamic testing protocol includes identifying security vulnerabilities and determining usability of the code or executable program. Lastly, the dynamic testing protocol compiles the output of the various tools and generates metrics and a reporting for ultimately determining whether the source code is validated in accordance with the second QMS. As should be understood, the tools and a dynamic testing protocol illustrated in FIG. 6 are merely exemplary and any number and type of dynamic analysis tools may be used and various dynamic testing protocols may be configured for executing the tools and performing the code analysis in accordance with the second QMS.

At step 435, the source code is validated in accordance with the second QMS. The validating includes performing code analysis to determine compliance or noncompliance of the source code with the second set of requirements. The code analysis is evaluated to determine verification (quality and compliance or noncompliance) of the source code with the second set of requirements defined within the second QMS. If the different analysis techniques demonstrate that the source code has adequate quality and compliance, then validity of the source code will be determined. The code analysis is evaluated to determine validity of the source code in accordance with the second set of requirements (e.g., the user's needs and that the specifications were correct in the first place) defined within the second QMS.

The code analysis may include static analysis and/or dynamic analysis performed in accordance with the first pipeline of tools and/or second pipeline of tools configured in steps 425 and 430, respectively. The static analysis may determine errors, high risk components, unexpected features, open source features, security vulnerabilities, and changes from version to version in the source code. The dynamic analysis may determine base functionality, localization functionality, performance metrics, and security vulnerabilities. In some instances, the static analysis determines: errors, high risk components, unexpected features, open source features, security vulnerabilities, and changes from version to version in the source code. In some instances, the dynamic analysis determines: base functionality, localization functionality, performance metrics, and security vulnerabilities. In some instances, determining the open source features comprises performing a white sourcing process. The white sourcing process includes: (i) identifying the open source features of the source code, (ii) determining permissions or licenses associated with the open source features, and (iii) compiling the permissions or licenses and the associated open source features into a data structure.

At step 440, upon invalidation of the source code, a notification of the invalidity is provided to the software development system. The notification can include information concerning one or more reasons for the invalidation.

At step 445, upon validation of the source code, a build process is executed to generate a executable program from the source code and perform version control of the executable program. The version control may include identifying a version of the source code based on the static analysis and generating an executable program version that includes the source code based on the identified version of the source code. The version control may further include managing the activation and visibility of the executable program version and/or older executable program versions including the source code.

At step 450, the executable program is deployed on a software platform. The deployment includes: (i) encapsulating the executable program in a container, and (ii) deploying the container on one or more nodes of a software platform. In some instances, the deployment further includes creating the one or more nodes on the software platform to host the executable program in the container. In some instances, the deployment further includes generating a pod instance that wraps the container and the pod instance is deployed on the one or more nodes of the software platform.

V. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:
receiving, at a continuous integration continuous deployment (CI/CD) system, source code from a software development system, wherein the source code has already been validated in accordance with a first quality management system (QMS) associated with the software development system, and wherein the first QMS defines a first set of requirements for validating the source code;
generating, by the CI/CD system, a profile for the source code, wherein the generating comprises:
identifying characteristics of the source code;
identifying a type and a format of data to be input to the source code and a type and a format of data to be generated by the source code; and
building the profile using the characteristics of the source code, the type and format of the data to be input to the source code, and the type and format of the data to be generated by the source code;
classifying, by the CI/CD system, the source code into a class of code based on the profile, wherein the classifying comprises:
querying, using the profile, a data structure storing a plurality of profiles associated with various classes of code;
identifying a plausible profile from the plurality of profiles that has a predetermined number of characteristics that match the characteristics of the source code, the type and format of the data to be input to the source code, and the type and format of the data to be generated by the source code; and
classifying the source code as the class of code associated with the plausible profile;
retrieving, by the CI/CD system, a second QMS associated with the class of code, wherein the second QMS defines a second set of requirements for validating the class of code;
validating, by the CI/CD system, the source code in accordance with the second QMS, wherein the validating comprises performing code analysis to determine compliance or noncompliance of the source code with the second set of requirements;
upon validation of the source code, executing, by the CI/CD system, a build process to generate an executable program from the source code;
encapsulating, by the CI/CD system, the executable program in a container; and
deploying, by the CI/CD system, the container on one or more nodes of a software platform.

2. The computer-implemented method of claim 1, wherein:
the software development system is located remotely over a network connection from the CI/CD system; and
the first set of requirements is different from the second set of requirements.

3. The computer-implemented method of claim 1, wherein the first set of requirements is defined to determine whether the source code: conforms to an intended use, performs as intended to implement the intended use, and satisfies a base level of security.

4. The computer-implemented method of claim 1, wherein:
the characteristics of the source code are identified by analyzing scope of source code comments and the source code, and
the characteristics of the source code include one or more programming languages used to write the source code, intended use of the source code, and environment in which the source code is intended to run.

5. The computer-implemented method of claim 1, wherein the classifying is performed using a classifier that takes as input the profile to generate an inference of the class of code based on the characteristics of the source code, the type and format of the data to be input to the source code, and the type and format of the data to be generated by the source code.

6. The computer-implemented method of claim 1, wherein the second set of requirements is defined to determine whether the source code: performs as intended to implement an intended use, satisfies an augmented level of security, satisfies requirements enforced by international, national, and/or regional regulations, satisfies data privacy concerns, and satisfies performance requirements specific to the container and a software platform environment.

7. The computer-implemented method of claim 1, further comprising:
configuring, by the CI/CD system, a first pipeline of tools to perform the code analysis in accordance with the second QMS, wherein the code analysis comprises static analysis and the configuring the first pipeline of tools comprises:
identifying a set of static analysis tools that is capable of analyzing the source code to satisfy the second set of requirements,
determining a static testing protocol to execute the set of static analysis tools to satisfy the second set of requirements, and
provisioning the set of static analysis tools within the first pipeline of tools in accordance with the static testing protocol.

8. The computer-implemented method of claim 7, further comprising:
configuring, by the CI/CD system, a second pipeline of tools to perform the code analysis in accordance with the second QMS, wherein the code analysis comprises dynamic analysis and the configuring the second pipeline of tools comprises:
identifying a set of dynamic analysis tools that is capable of analyzing the source code to satisfy the second set of requirements,
determining a dynamic testing protocol to execute the set of static analysis tools to satisfy the second set of requirements, and
provisioning the set of dynamic analysis tools within the second pipeline of tools in accordance with the dynamic testing protocol.

9. The computer-implemented method of claim 8, wherein the static analysis determines: errors, high risk components, unexpected features, open source features, security vulnerabilities, and changes from version to version in the source code, and the dynamic analysis determines: base functionality, localization functionality, performance metrics, and security vulnerabilities.

10. The computer-implemented method of claim 9, wherein determining the open source features comprises:
identifying, by the CI/CD system, the open source features of the source code;
determining, by the CI/CD system, permissions or licenses associated with the open source features; and
compiling, by the CI/CD system, the permissions or licenses and the associated open source features into a data structure.

11. The computer-implemented method of claim 7, further comprising:
identifying, by the CI/CD system, a version of the source code based on the static analysis;
generating, by the CI/CD system, a new executable program version comprising the source code based on the identified version of the source code; and
managing, by the CI/CD system, activation and visibility of the new executable program version and/or older executable program versions comprising the source code.

12. The computer-implemented method of claim 1, further comprising creating, by the CI/CD system, the one or more nodes on the software platform to host the executable program in the container.

13. The computer-implemented method of claim 1, further comprising: upon invalidation of the source code, providing, by the CI/CD system, the software development system with a notification that the source code is invalid, wherein the notification includes information concerning one or more reasons for the invalidation of the source code.

14. The computer-implemented method of claim 1, wherein the second set of requirements is defined in consideration of intended use of the source code being within a medical device or as a medical device.

15. A system comprising:
one or more data processors of a continuous integration continuous deployment (CI/CD) system; and
a non-transitory computer readable storage medium containing instructions which, when executed on the one or more data processors, cause the one or more data processors to perform actions including:
receiving source code from a software development system, wherein the source code has already been validated in accordance with a first quality management system (QMS) associated with the software development system, and wherein the first QMS defines a first set of requirements for validating the source code;
generating a profile for the source code, wherein the generating comprises:
identifying characteristics of the source code;
identifying a type and a format of data to be input to the source code and a type and a format of data to be generated by the source code; and
building the profile using the characteristics of the source code, the type and format of the data to be input to the source code, and the type and format of the data to be generated by the source code;
classifying the source code into a class of code based on the profile, wherein the classifying comprises:
querying, using the profile, a data structure storing a plurality of profiles associated with various classes of code;
identifying a plausible profile from the plurality of profiles that has a predetermined number of characteristics that match the characteristics of the source code, the type and format of the data to be input to the source code, and the type and format of the data to be generated by the source code; and
classifying the source code as the class of code associated with the plausible profile;
retrieving a second QMS associated with the class of code, wherein the second QMS defines a second set of requirements for validating the class of code;
validating the source code in accordance with the second QMS, wherein the validating comprises performing code analysis to determine compliance or noncompliance of the source code with the second set of requirements;
upon validation of the source code, executing a build process to generate an executable program from the source code;
encapsulating the executable program in a container; and
deploying the container on one or more nodes of a software platform.

16. The system of claim 15, wherein:
the software development system is located remotely over a network connection from the CI/CD system; and
the first set of requirements is different from the second set of requirements.

17. The system of claim 15, wherein the first set of requirements is defined to determine whether the source code: conforms to an intended use, performs as intended to implement the intended use, and satisfies a base level of security.

18. The system of claim 15, wherein:
the characteristics of the source code are identified by analyzing scope of source code comments and the source code, and
the characteristics of the source code include one or more programming languages used to write the source code, intended use of the source code, and environment in which the source code is intended to run.

19. A computer-program product tangibly embodied in a non-transitory machine-readable storage medium, including instructions configured to cause one or more data processors of a continuous integration continuous deployment (CI/CD) system to perform actions including:
receiving source code from a software development system, wherein the source code has already been validated in accordance with a first quality management system (QMS) associated with the software development system, and wherein the first QMS defines a first set of requirements for validating the source code;
generating a profile for the source code, wherein the generating comprises:
identifying characteristics of the source code;
identifying a type and a format of data to be input to the source code and a type and a format of data to be generated by the source code; and
building the profile using the characteristics of the source code, the type and format of the data to be input to the source code, and the type and format of the data to be generated by the source code;
classifying the source code into a class of code based on the profile, wherein the classifying comprises:
querying, using the profile, a data structure storing a plurality of profiles associated with various classes of code;
identifying a plausible profile from the plurality of profiles that has a predetermined number of characteristics that match the characteristics of the source code, the type and format of the data to be input to the source code, and the type and format of the data to be generated by the source code; and
classifying the source code as the class of code associated with the plausible profile;
retrieving a second QMS associated with the class of code, wherein the second QMS defines a second set of requirements for validating the class of code;
validating the source code in accordance with the second QMS, wherein the validating comprises performing code analysis to determine compliance or noncompliance of the source code with the second set of requirements;

upon validation of the source code, executing a build process to generate an executable program from the source code;

encapsulating the executable program in a container; and deploying the container on one or more nodes of a software platform.

20. The computer-program product of claim 19, wherein the classifying is performed using a classifier that takes as input the profile to generate an inference of the class of code based on the characteristics of the source code, the type and format of the data to be input to the source code, and the type and format of the data to be generated by the source code.

* * * * *